United States Patent
Fukushima

(10) Patent No.: US 8,321,641 B2
(45) Date of Patent: Nov. 27, 2012

(54) DATA ACCESS METHOD AND DATA ACCESS DEVICE

(75) Inventor: Hiroki Fukushima, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 437 days.

(21) Appl. No.: 12/350,872

(22) Filed: Jan. 8, 2009

(65) Prior Publication Data

US 2009/0182958 A1 Jul. 16, 2009

(30) Foreign Application Priority Data

Jan. 16, 2008 (JP) ................................ 2008-007175

(51) Int. Cl.
G06F 12/02 (2006.01)
(52) U.S. Cl. ................. 711/156; 711/E12.002; 711/170
(58) Field of Classification Search .................. 711/103, 711/156, 112, E12.006, 170
See application file for complete search history.

(56) References Cited

U.S. PATENT DOCUMENTS

| | | | | |
|---|---|---|---|---|
| 6,640,290 B1 * | 10/2003 | Forin et al. | .................... | 711/156 |
| 7,911,887 B2 * | 3/2011 | Yano | ............................. | 369/30.1 |
| 2004/0186967 A1 * | 9/2004 | Anand | ........................... | 711/156 |
| 2006/0126469 A1 | 6/2006 | Urushibara et al. | | |
| 2009/0180209 A1 | 7/2009 | Maeda et al. | | |
| 2010/0106897 A1 * | 4/2010 | Yoshimura | .................... | 711/103 |

FOREIGN PATENT DOCUMENTS

| | | |
|---|---|---|
| JP | 8-221317 A | 8/1996 |
| JP | 2004078410 A | 3/2004 |
| WO | 2007034706 A1 | 3/2007 |

OTHER PUBLICATIONS

Chinese Office Action in corresponding Chinese Application No. 200910001738.9, dated Jan. 7, 2011, 14 pages.
Japanese Office Action issued in corresponding JP Application No. 2008-007175, dated Sep. 4, 2012, 4 pages.

* cited by examiner

Primary Examiner — Pierre-Michel Bataille
(74) Attorney, Agent, or Firm — Seed IP Law Group PLLC

(57) ABSTRACT

A recording medium has a real data area built from a plurality of clusters and a fat (File Allocation Table) built from a plurality of entries showing usage conditions of the corresponding clusters. A control unit previously divides the fat into a plurality of blocks and creates, in RAM, a search table, at each block, showing presence or absence of an entry (unassigned entry) corresponding to an unassigned cluster. When data are written into the recording medium, the position of a block including an unassigned entry is located on the basis of the search table. Subsequently, the block is read in RAM, thereby locating the position of the unassigned cluster. Data are written in the thus-located cluster.

4 Claims, 4 Drawing Sheets

| | $E_0$ | $E_1$ | $E_2$ | $E_3$ | | | | |
|---|---|---|---|---|---|---|---|---|
| | 1 | 2 | Eof | Null | Null | 6 | 8 | Null |
| | 9 | Eof | 12 | Eof | Null | 14 | 15 | 16 |
| | . | . | . | | | | | |

| FILE A | 0 |
|---|---|
| FILE C | 5 |
| FILE D | 10 |
| FILE E | 13 |
| . | . |
| . | |

DATA ACCESS METHOD AND DATA ACCESS DEVICE

PRIORITY INFORMATION

This application claims priority to Japanese Patent Application No. 2008-7175 filed on Jan. 16, 2008 which is incorporated herein by reference in its entirety.

BACKGROUND

1. Technical Field

The present invention relates to a data access method and a data access device for making an access to a recording medium in order to write data into the recording medium having a real data area formed from a plurality of clusters and a management table formed from a plurality of entries showing a usage state of corresponding clusters.

2. Related Art

Many electronic devices that are currently available in the market; for instance, digital audio equipment, a digital camera, a personal computer, or the like, are equipped with a recording medium for recording and holding data. Data recorded in such a recording medium is usually managed in accordance with a previously-defined file system; for instance, an FAT file system. In such a file system, the recording medium is usually coarsely divided into a real data area where real data are recorded and a management area where data for data management are recorded. The management area is provided with a table showing usage conditions of the real data area; for instance, a File Allocation Table (FAT). When new data are written into the recording medium, a data access unit provided in an electronic device locates the position of a data writable area; namely, a so-called free storage area, by reference to the FAT.

Incidentally, a time involved in location of the position of a free storage area recently increases along with an increase in the capacity of a recording medium, which in turn raises a problem of an increase in data write processing time. Such an increase in data write processing time raises a big problem in a system requiring real-time data write operation.

Accordingly, there have been some proposals of creation and utilization of a bitmap showing a usage condition of a real data area in order to quickly locate the position of a free storage area (for instance, JP 8-221317 A, and so forth). More specifically, a real data area is divided into a plurality of blocks, thereby preparing a map that represents an assigned or unassigned state of each of the blocks by means of bit values. It has been proposed to hold the bitmap in main memory and make a reference to the bitmap as necessary. The main memory can make a faster access than does the recording medium. Therefore, according to the method for holding the bitmap in the main memory, the position of a free storage area can be quickly located.

Although main memory enables making of a high-speed access, the main memory is very smaller than the recording medium in terms of capacity. When a bitmap is held in such small-capacity main memory, a memory space for implementing processing pertaining to various processes cannot be sufficiently assured, which may adversely affect system processing. In particularly, in the case of a portable electronic device; for instance, a portable audio device, and the like, the capacity of the main memory is often comparatively small. Therefore, the problem noticeably appears.

Therefore, the present invention provides a data access method and a data access device that enable high-speed writing of data without affecting system processing.

SUMMARY

A data access method of the present invention is a data access method for making an access to a recording medium having a real data area built from a plurality of clusters and a management table built from a plurality of entries showing usage conditions of corresponding clusters, in order to write data into the recording medium, the method comprising:

dividing the management table into blocks of a predetermined size before writing data into the recording medium and creating, in main memory, a search table, at each block, showing whether or not there are unassigned entries serving as entries corresponding to unassigned clusters; and locating a position of a block where an unassigned entry is present on the basis of the search table when writing data into the recording medium, reading the located block in the main memory, locating positions of unassigned clusters on the basis of the read data, and writing of data to be written into the located unassigned cluster.

In a preferred mode, the block assumes is of data size or less by means of which the block can be read by one access into the recording medium. Moreover, it is preferable that the search table represents presence or absence of an unassigned entry in each block by means of one bit or one byte.

A data access device that is another present invention is a data access device for making an access to a recording medium having a real data area built from a plurality of clusters and a management table built from a plurality of entries showing usage conditions of corresponding clusters, in order to write data into the recording medium, the device comprising:

a control unit;

main memory to which the control unit can make a direct access; and a medium controller which is capable of making an access to the recording medium and which is driven and controlled by the control unit, wherein the control unit divides the management table into blocks of a predetermined size before writing data into the recording medium and creates, in main memory, a search table, at each block, showing whether or not there are unassigned entries serving as entries corresponding to unassigned clusters; and locates a position of a block where an unassigned entry is present on the basis of the search table when writing data into the recording medium, reads data in the located block into the main memory by driving the medium controller, locating positions of unassigned clusters on the basis of the read data, and writes data to be written into the located unassigned cluster by driving the medium controller.

In the present invention, the position of an unassigned cluster is located on a per-block basis by use of a search table showing presence or absence of an unassigned entry; in other words, a table that is significantly reduced in terms of an amount of data. Thereby, a memory size required to locate the position of an unassigned cluster can be significantly reduced. As a consequence, high-speed data write becomes possible without affecting system processing.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein:

FIG. 3A is a conceptual rendering of a directory table held in a management area;

FIG. 3B is a conceptual rendering of an fat held in the management area; and

DETAILED DESCRIPTION

Figure 1:
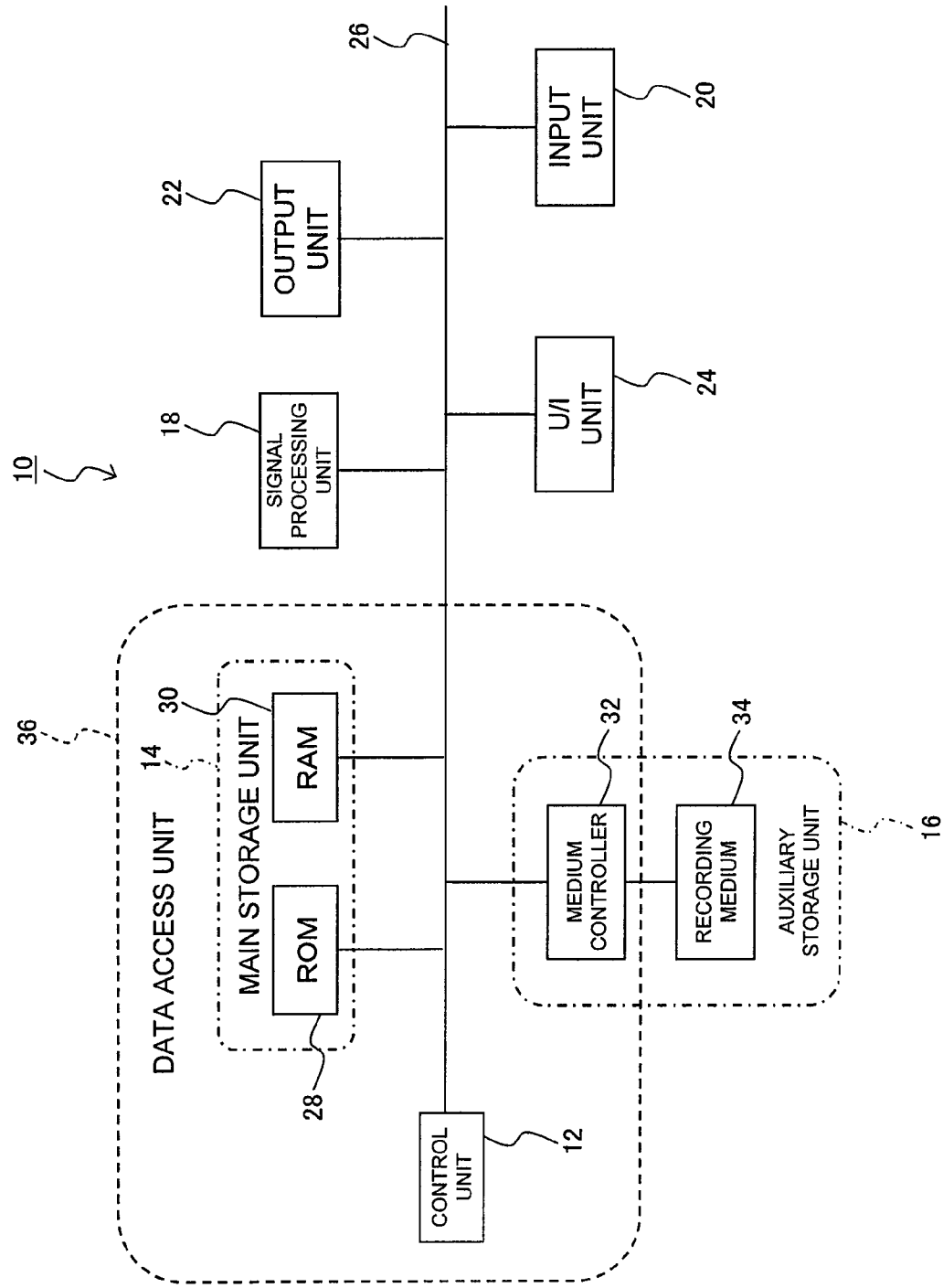
FIG. 1 is a block diagram showing a general configuration of an audio device that is an embodiment of the present invention.

An embodiment of the present invention will be described hereunder by reference to the drawings. FIG. 1 is a block diagram showing a general configuration of a portable digital audio device 10 (hereinafter simply called "an audio device") that is an embodiment of the present invention. The audio device 10 is an electronic device that records and reproduces audio data, and has a control unit 12 formed from a CPU, and others. The control unit 12 is connected, by way of a bus 26, to a main storage unit 14 built from ROM 28 and RAM 30; a medium controller 32 that drives a recording medium 34; a signal processing unit 18 that subjects an audio signal to known signal processing; a user interface unit (U/I unit) 24 that accepts a command from the user; an output unit 22 built from a speaker, and the like; an input unit 20 built from a microphone, and the like; and others. Further, the medium controller 32 is connected to a recording medium 34 that records or retains various user data including audio data. The medium controller 32 and the recording medium 34 constitute an auxiliary storage unit 16 that permanently records and holds various data. Moreover, of respective units constituting the audio device 10, the control unit 12, the main storage unit 14, and the medium controller 32 act as a data access unit 36 that makes an access to the recording medium 34 for reading and writing data.

When audio data recorded in the recording medium 34 are reproduced, the data access unit 36 built from the control unit 12, and others, makes an access to the recording medium 34, thereby reading the audio data. The signal processing unit 18 subjects the thus-read audio data to known signal processing; for example, signal format conversion processing, audio key (music interval) change processing, tempo change processing, dynamics change processing, or the like, thereby producing a reproduction signal. The thus-generated reproduction signal is output to the outside by way of the output unit 22.

Moreover, when an audio signal (an input signal) input by way of the input unit 20 is recorded, the signal processing unit 18 subjects the input signal to known signal processing; for instance, signal format conversion processing, noise reduction processing, processing for synthesizing an audio signal with a reproduction signal, or the like, thereby generating a record signal. The data access unit 36 sequentially writes the thus-generated record signal into the recording medium 34, whereby sound recording is implemented.

When sound is recorded, naturally the data access unit 36 is continually supplied with data to be written (a record signal). Thus, under the circumstances of continual supply of data, quick performance of data write processing is requested. The reason for this is that, when data write processing speed is excessively lower than data supply speed, the overflow of data from a buffer (memory) arises, which makes it impossible to perform appropriate record processing. In particular, a strong desire for enhancement of a data write processing speed exists for a portable electronic device that cannot free up a large-capacity buffer. In the present embodiment, the configuration of the data access unit 36; in particular, control specifics of the data access unit 36, are made special to solve the problem. Detailed descriptions are now provided for the control specifics hereunder.

As mentioned previously, in the present embodiment, the control unit 12, the main storage unit 14, and the medium controller 32 constitute the data access unit 36 that makes an access to the recording medium 34 for writing data. Of these units, the control unit 12 is built from a CPU and performs various processing operations in accordance with a program stored in the ROM 28. Of the processing operations performed by the control unit 12, processing pertaining to data write processing includes processing for preparing a search table, processing for locating the position of an unassigned area (an unassigned cluster) in the recording medium 34 by utilization of the search table, and the like. These processing operations will be described in detail later.

The main storage unit 14 is a storage unit to which the control unit 12 can make a direct access, and is built from ROM 28 for read only purpose and readable and writable RAM 30. As mentioned previously, a program for driving and controlling the audio device 10 is stored in the ROM 28. The RAM 30 is built from; for instance, DRAM, SDRAM, or the like, and corresponds to main memory used when the control unit 12 performs various processing operations. The RAM 30 enables making of a faster access than does the recording medium 34 but is smaller than the same in terms of capacity. Therefore, only data required by the control unit 12 to perform processing are temporarily stored in the RAM 30. The search table to be described in detail later is stored and held in the RAM 30. The medium controller 32 drives and controls the recording medium 34 and makes an access to the recording medium in compliance with a command from the control unit 12. From another viewpoint, the control unit 12 does not make a direct access to the recording medium 34 but can make an access to the recording medium 34 only by way of a medium controller.

The recording medium 34 records and holds user data, such as audio data and corresponds to; for instance, semiconductor memory such as flash memory, a hard disk drive, and the like. In the recording medium 34, data are managed in compliance with a FAT file system. A data configuration conforming to the FAT file system will be briefly described by reference to FIGS. 2 and 3.

As is well known, the FAT file system is a system that manages data on a per-file basis by utilization of a table called a File Allocation Table. The File Allocation Table is usually abbreviated as "FAT." However, in order to clarify a distinction between the file allocation table and an FAT used as a designation of a file system, the File Allocation Table is herein designated as "fat" in lower case.

Figure 2:
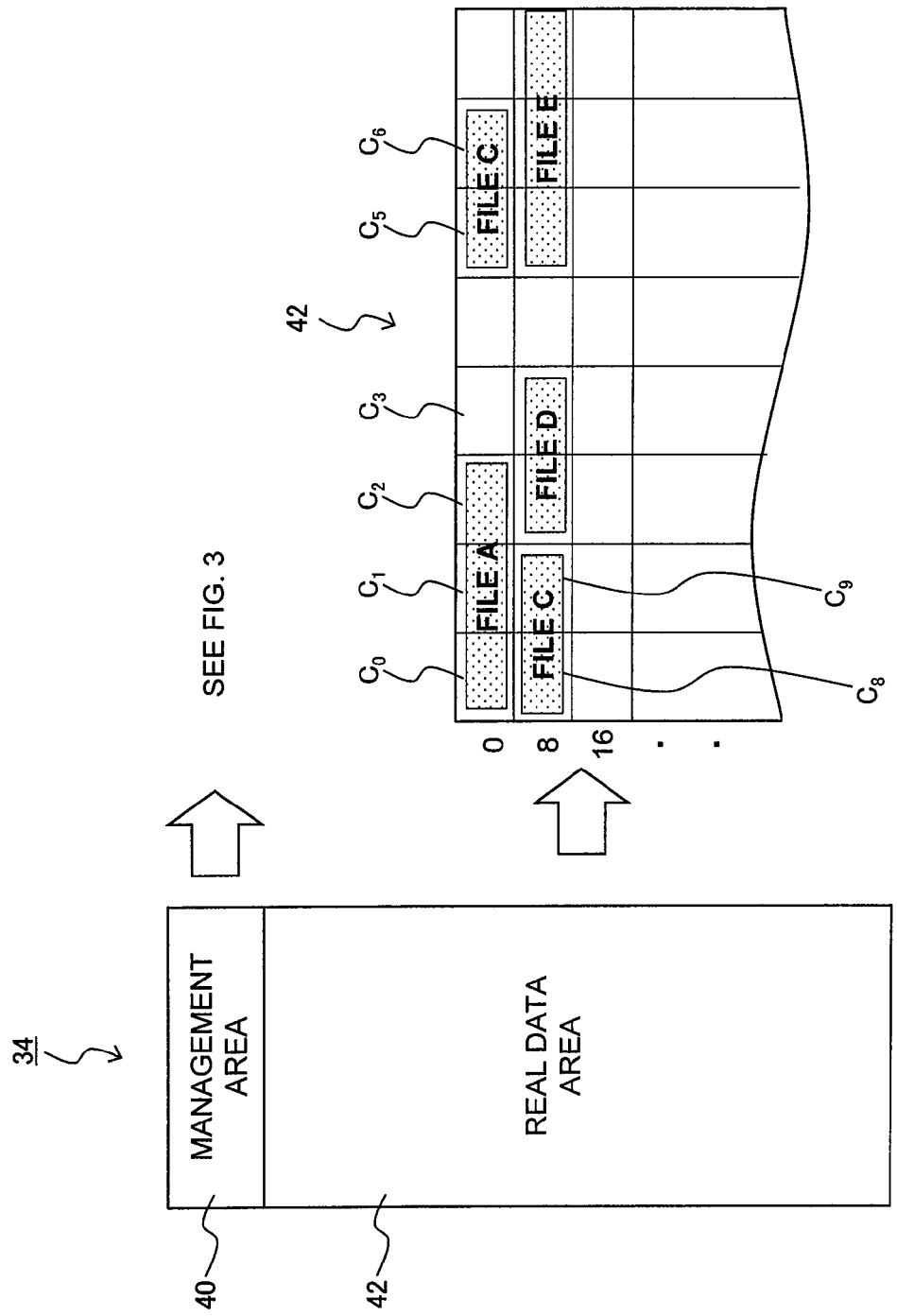
FIG. 2 is a conceptual rendering showing a data configuration achieved in a recording medium.

In the FAT file system, the recording medium 34 is coarsely divided into a real data area 42 where real data (user data) are recorded and a management area 40 where data for managing the real data area 42, such as fat, are recorded, as shown in FIG. 2.

The real data area 42 is divided into fixed-length blocks called clusters and managed as the clusters. Each of the clusters is a group of a predetermined number of sectors. The sector is a minimum unit employed when a medium controller makes an access. In the case of semiconductor memory, one sector usually corresponds to 512 bytes. Therefore, when a cluster is built from "m" sectors, the size of one cluster comes to "m"×512 bytes.

A file is built from one or more clusters in accordance with a data size of the file. The clusters constituting one file are not necessarily contiguous and may be discontiguous. For instance, it may be the case where clusters $C_5$, $C_6$, $C_8$, and $C_9$ constituting one file C will be discontiguous, as shown in FIG. 2.

The management area 40 stores data for managing the real data area 42; specifically, a directory table 44 (see FIG. 3A), a fat 46 (see FIG. 3B), and others. The directory table 44 is a table where the number and attribute of a leading cluster of each file, and the like, are recorded.

The fat 46 is a table showing a position in the real data area 42 where each file is recorded and acts as a management table built from a plurality of entries showing usage conditions of corresponding clusters. Specifically, the fat 46 is built from constituent elements called entries provided for respective clusters, and a cluster number, by means of which the continuation of data of a corresponding cluster is recorded, is recorded in each of the entries. For instance, in an embodiment shown in FIG. 2, the continuation of data (file A) of the $0^{th}$ cluster $C_0$ is recorded in the first cluster $C_1$. Therefore, a cluster number "1" is recorded in the $0^{th}$ entry $E_0$ corresponding to the $0^{th}$ cluster $C_0$. Likewise, since the continuation of the data in the first cluster $C_1$ is recorded in the second cluster $C_2$, the cluster number "2" is recorded in the first entry $E_1$ corresponding to the first cluster $C_1$. The second cluster $C_2$ corresponds to the end of a file A, and the continuation of data pertaining to the second cluster $C_2$ is not present. In this case, "E of (End of File)" signifying the end of a file is recorded in the second entry $E_2$ corresponding to the second cluster $C_2$. When data are not recorded in a corresponding cluster; in other words, when a corresponding cluster is an unassigned cluster, Null is recorded in the entry. For instance, in the embodiment shown in FIG. 2, the third cluster $C_3$ is an unassigned cluster where no data are recorded. Therefore, "Null" is recorded in the third entry $E_3$ corresponding to the third cluster $C_3$.

Entries of the fat 46 equal in number to the clusters are prepared. Further, in the case of an FAT 16, the data size of each of the entries is 16 bits (two bytes). In the case of an FAT 32, the data size of each of the entries is 32 bits (four bytes). Therefore, the data size of the overall fat 46 comes to a total number of clusters×two bytes (or four bytes).

Flow achieved when user data are written into the recording medium 34 is as follows. The control unit 12 first locates the position of an unassigned cluster in the recording medium 34. When the location of the unassigned cluster can be located, the user data temporarily stored in the RAM are written into the unassigned cluster by driving the medium controller 32.

The position of the unassigned cluster has hitherto been located by searching the fat 46. The control unit 12 cannot make a direct access to the recording medium 34. Therefore, when searching the fat 46, the control unit 12 needs to read the fat 46 onto the RAM 30 from the recording medium 34. However, recently the data size of the fat 46 is also increased along with an increase in the capacity (the number of clusters) of the recording medium 34. There has been a problem of an increase in the time involved in reading of the fat 46 and, by extension, an increase in the time involved in location of the position of an unassigned cluster.

Accordingly, there are some proposals for making an attempt to speed up processing for locating the position of an unassigned cluster by preparing a bitmap representing the assigned or unassigned state of each cluster and by utilization of the bitmap. Namely, a map (bitmap) representing the assigned or unassigned state of each of clusters is prepared on the basis of the fat 46 at timing, such as startup of an electronic device, and the map is held in the RAM 30 in the form of a bit value. When location of the position of an unassigned cluster is required, the bitmap held in the RAM 30 is retrieved, thereby locating the position of an unassigned cluster. Such a method does not require reading of the fat 46 every time write processing performed and, hence, yields an advantage of the ability to locate the position of an unassigned cluster within a comparatively-short period of time. However, under the method utilizing the bitmap, a considerable amount of memory is consumed for recording and retaining the bitmap. In some cases, there arises a problem of performance of processing pertaining to another process being adversely affected. Specifically, since the bitmap utilizes one bit for each cluster, the overall data size comes to one bit×a total number of clusters. In existing circumstances where large-capacity recording mediums of the order of tens of gigabytes to hundreds of gigabytes are in circulation, a bitmap of such a size cannot be said to be sufficiently small. If a large amount of memory is consumed for holding the bitmap, a memory space required to perform processing pertaining to another process cannot be freed up, which as a consequence adversely affects performance of processing pertaining to another process. In the case of a portable electronic device that is difficult to have large-capacity RAM, the problem becomes particularly critical.

Figure 4:
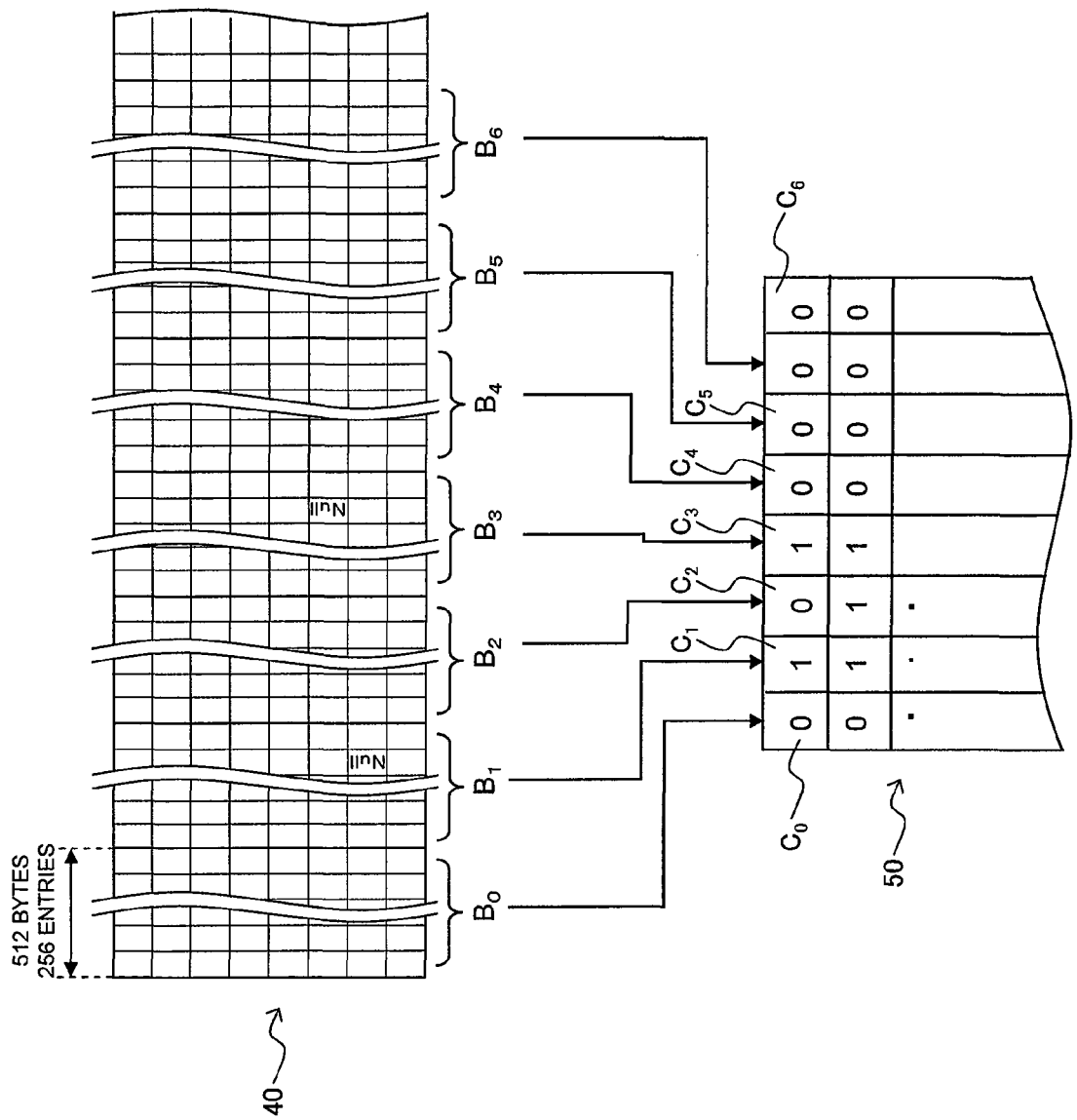
FIG. 4 is a conceptual rendering of a search table.

Accordingly, in the present embodiment, a search table 50, such as that illustrated in FIG. 4, is prepared in lieu of the bitmap in order to significantly reduce the memory size required for processing while decreasing the time involved in location of the position of an unassigned cluster.

The search table 50 is a table utilized for locating the position of an unassigned cluster. Like the foregoing bitmap, the search table is prepared at timing where the number of processes to be performed by the control unit 12 is comparatively small, such as a time of startup of the audio device 10 or a standby condition where reproduction or recording is not performed. The search table is held in the RAM 30.

The search table 50 is a table representing whether or not entries corresponding to unassigned clusters (hereinafter called "unassigned entries") are present in each block when the fat 46 is divided into a plurality of blocks of predetermined size. The data size of each block is equal to or smaller than a data size at which the block can be read by one access.

Specifically, the search table is described by means of taking, by way of example, semiconductor memory adopting a FAT 16 system. In the case of the FAT 16 system, a data size of one entry is 16 bits=two bytes. In the meantime, the data size (sector) that can be read by one access is usually 512 bytes in the case of semiconductor memory. Therefore, when the fat 46 is divided into a plurality of blocks on a per-sector basis, 512/2=256 entries are included in one block (see FIG. 4).

The search table 50 represents, in the form of a bit value, whether or not unassigned entries are included in 256 entries belonging to one block. Specifically, when an unassigned entry is present in one block, the bit number is taken as one. When the unassigned entry is not present, the bit value is taken as zero.

For instance, when an unassigned entry is not present in the $0^{th}$ sector $B_0$ as in the embodiment shown in FIG. 4, a bit value $C_0$ of the search table 50 corresponding to the $0^{th}$ sector $B_0$ comes to zero. Since the unassigned entry is present in the first block $B_1$, a bit value $C_1$ of the search table corresponding to the first block $B_1$ is taken as one. Likewise, bit values are set for the second block and subsequent blocks on the basis of whether or not an unassigned entry is present. The thus-prepared search table 50 becomes a table schematically showing positions of unassigned clusters. From another viewpoint, the search table 50 can be said to beatable showing a position of a block including unassigned entries. Specifically, it is seen that unassigned entries are present in the first block $B_1$ and the third block $B_3$ by reference to the illustrated search table 50.

In the present embodiment, the search table 50 is prepared in advance and held in the RAM 30. When positions of unassigned clusters are located, a reference is made to the search table 50 held in the RAM 30, thereby locating positions (blocks) of the unassigned entries in the fat 46. The positions of the unassigned entries in the fat 46 are located on the basis of the search table 50 already held in the RAM 30, so that location can be performed in a very short period of time.

When the search table 50 is held in the RAM 30, the use of the memory is naturally limited by an amount corresponding to the data size of the search table. However, the search table 50 of the present embodiment is extremely small in data size than the fat 46 or the foregoing bitmap. Therefore, even when the search table is held in the RAM 30 at all times, performance of processing pertaining to another process is hardly affected. The data size of the overall fat 46 is (16 bits×a total number of clusters), whereas the data size of the bitmap used in some application is (one bit×a total number of clusters). In the meantime, the search table 50 of the present embodiment uses one bit every 256 entries. The number of entries constituting the fat 46 is equal to a total number of clusters; hence, the data size of the overall search table 50 comes to (one bit× a total number of clusters/256). In short, the data size of the search table comes to 1/(256*16) of the data size of the fat 46. Further, even when compared with the foregoing bitmap, the search table 50 is $1/256^{th}$ of the bitmap in terms of a data size. Namely, the search table 50 of the present embodiment is significantly reduced in data size than the fat 46 and the foregoing bitmap, and the memory size required to hold the search table in the RAM 30 is greatly reduced. As a consequence, even when the search table 50 is held in the RAM 30 at all times, performance of processing pertaining to another process is hardly affected.

So long as the positions of the unassigned entries can be located on the fat 46, the control unit 12 drives the medium controller 32, thereby reading data in the thus-located blocks to the RAM 30. When the block data are read in the RAM 30, the control unit 12 locates the positions of the unassigned clusters on the basis of the block data. As mentioned previously, one block is equal to or smaller than a data size (a sector) that can be read by one access. Therefore, data pertaining to a block where unassigned entries are present can be inevitably read by one access. Put another way, in the present embodiment, so long as only one access is made to a recording medium, positions of unassigned clusters can be located. Consequently, when compared with the related-art locating method that reads the fat 46 in sequence from the top into the RAM 30, positions of unassigned clusters can be located within an extremely short period of time. So long as the positions of unassigned clusters can be located, required user data can be appropriately written into the unassigned clusters.

As is obvious from the above descriptions, the present embodiment obviates a necessity for sequentially reading the fat 46 of large volume from the top at the time of writing of data, so that the time involved in location of positions of unassigned clusters can be significantly reduced. The data size of the search table 50 of the present embodiment is significantly reduced when compared with the fat 46 and the foregoing bitmap. Therefore, a memory size required to hold the search table 50 can be considerably reduced. As a consequence, preparation of the large-capacity RAM 30 is not necessary, and an increase in the size and cost of the overall audio device can be prevented.

The search table 50 representing the state of one block (256 entries) by one bit is utilized in the present embodiment, however, a search table expressing the state of one block by one byte may also be used. Expressing the state of one block by one byte results in obviation of a necessity for bit operation, so that a program for making a reference to the search table can be simplified. In a case where one byte is allocated every one block, naturally the data size of the search table is increased by a factor of about eight. However, even in such a case, the search table is $1/32^{th}$ of the foregoing bitmap in terms of a data size and sufficiently small. In other words, even when a search table representing the state of one block by one byte is used, the memory size required to locate positions of unassigned clusters can be significantly reduced, and further an operation program for locating positions can be simplified.

Although descriptions are provided in the present patent specification by means of taking the audio device 10 as an example, the configuration of the data access unit 36 of the present embodiment can also be applied to an electronic device requiring fast data write processing; for instance, a digital camera, a PDA, a personal computer, and the like. Moreover, the FAT file system is mentioned as an example of a data management system in the present embodiment. However, the present invention may also be applied to another data management system, so long as a real data area is divided into a plurality of clusters and a table representing usage conditions of respective clusters is present in the recording medium.

What is claimed is:

1. A data access device for making an access to a recording medium having a real data area built from a plurality of clusters and a management table built from a plurality of entries showing usage conditions of corresponding clusters, in order to write data into the recording medium, the device comprising:
   a control unit;
   main memory to which the control unit is configured to make a direct access; and
   a medium controller which is capable of making an access to the recording medium and which is driven and controlled by the control unit, wherein
   the control unit divides the management table into blocks of a predetermined size before writing data into the recording medium, wherein the predetermined size is equal to or less than a data size that can be read in one access to the recording medium, and creates a search table in main memory, wherein the search table represents, for each of the blocks in the form of one byte or less, whether or not there are any unassigned entries in the block corresponding to unassigned clusters in the real data area without indicating how many unassigned entries exist in the block; and
   the control unit further locates a position of a block where any unassigned entries are present with reference to the search table when writing data into the recording medium, thereafter reads data in the located block, among the data of the management table stored in the recording medium, into the main memory by driving the medium controller, locates positions of unassigned clusters on the basis of the read data, and writes data to be written into the located unassigned clusters by driving the medium controller.

2. A data access method for making an access to a recording medium having a real data area built from a plurality of clusters and a management table built from a plurality of entries showing usage conditions of corresponding clusters, in order to write data into the recording medium, the method comprising:

dividing the management table into blocks of a predetermined size before writing data into the recording medium, wherein the predetermined size is equal to or less than a data size that can be read in one access to the recording medium;

creating a search table in main memory, wherein the search table represents, for each of the blocks in the form of one byte or less, whether or not there are any unassigned entries in the block corresponding to unassigned clusters in the real data area without indicating how many unassigned entries exist in the block;

locating a position of a block where any unassigned entries are present with reference to the search table when writing data into the recording medium; and reading data of the located block, among the data of the management table stored in the recording medium, into the main memory, locating positions of unassigned clusters on the basis of the read data, and writing data to be written into the located unassigned clusters.

3. The data access method according to claim 2, wherein the search table represents presence or absence of an unassigned entry in each block by means of one bit.

4. The data access method according to claim 2, wherein the search table represents presence or absence of an unassigned entry in each block by means of one byte.

* * * * *